United States Patent
Lee et al.

[11] Patent Number: 5,848,153
[45] Date of Patent: Dec. 8, 1998

[54] BLAST PROOF APPARATUS FOR THE COIN RETURN CAVITY OF A PUBLIC PHONE

[75] Inventors: Yi-Rong Lee, Keelung; Li-Te Cheng; Sung-Min Lin, both of Taipei, all of Taiwan

[73] Assignee: Protel Pacific Corporation, Taipei, Taiwan

[21] Appl. No.: 896,209

[22] Filed: Jul. 17, 1997

[51] Int. Cl.[6] .......................... H04M 17/00; H04M 1/00
[52] U.S. Cl. ............................. 379/451; 379/145
[58] Field of Search ...................... 379/145, 144, 379/150, 437, 451; 232/57.5, 51.5

[56] References Cited

U.S. PATENT DOCUMENTS 4,966,325  10/1990  Anello et al. ........................... 379/145

*Primary Examiner*—Jack Chiang
*Attorney, Agent, or Firm*—Proskauer Rose LLP

[57] ABSTRACT

A blast proof apparatus for the coin return cavity of a public phone, having the embodiment of the coin return cavity cover comprises an inner cover and an outer cover; a spring element between the said inner cover and the outer cover forming an elastic force to bind the two covers closely contact with each other, a plurality of through holes formed on the surface of the inner cover, the said cover combination being then placed to the coin return mouth by a pivot so the cover is able to be pushed inward for money removing process. If an explosion occurs inside the coin return cavity, the high pressure formed by the explosion pushes the outer cover outward through the through holes on the inner cover and is released in order to avoid possible damages in the coin return apparatus.

3 Claims, 4 Drawing Sheets

BLAST PROOF APPARATUS FOR THE COIN RETURN CAVITY OF A PUBLIC PHONE

FIELD OF INVENTION

The present invention relates to a blast proof apparatus for the coin return cavity of a public phone, in particular to the design of the coin return mouth cover so that once an explosion occurs, the high pressure formed accordingly is released without damaging the coin return apparatus.

BACKGROUND OF THE INVENTION

When a public phone is used by a caller, coins inserted are stored in a predetermined compartment temporally. And the coins are sequentially collecting automatically when the call is connected. If the call is not answered and/or the caller has finished using the phone, the unused temporally stored coins will be transferred to the coin return cavity by the coin return mechanism and the apparatus thereof, so they may be removed by the caller. The conventional coin return cavity cover is a single direction moving cover so that when the cover is pushed inward to its final extent, the said coin return cavity cover will then covers up the end of the coin return tunnel accordingly to prevent petty criminals insert the long strip tool into the coin return tunnel and damages the coin return apparatus at the same time to steal the money.

However, there remains another problem for the above mentioned conventional coin return cavity cover. That is, the explosives are quite often placed in the coin return cavity by the criminals and exploded within the closed coin return cavity. Since it is not possible for the conventional coin return cover to move outward, the destruction made by the high pressure formed in the explosion will reach its final extent and cause vigorous damages on the coin return cavity and even further to the valuable payphone control circuit board.

SUMMARY OF THE INVENTION

It is an object of the present invention to provide a blast proof apparatus for coin return cavity of a public phone, where the cover of the coin return cavity comprises an inner cover and an outer cover binding together; through a spring element, the said inner cover and the outer cover are bind closely together. A numbers of through holes formed on the surface of the inner cover allows the high pressure formed by the explosive within the coin return cavity to be released by pushing the outer cover outward through the through holes of the inner cover so the possible damage on the coin return apparatus is avoid.

Based on this, the embodiment of the present invention comprises an inner cover and an outer cover. And the inner cover has a width greater than the coin return cavity with a number of through holes formed on its surface. The said outer cover has a width less than the coin return mouth and attached to the outer surface of the inner cover, as the pivot positioned at the top inside the coin return cavity is inserted into both the outer and inner covers. The weight and embodiment of the said unity cover item then occludes the coin return cavity. The spring element at the fixation point of the pivot forms an elastic force on the outer cover to bind the outer cover and the inner cover closely so that under the normal condition, both the inner and outer covers are pushed inward together to open up the coin return cavity, where as the outer cover may be pushed outward through the through holes of the inner cover in an explosion in order to release the pressure formed and prevent possible damages on the coin return apparatus.

While the structure and features of the present invention will become more apparent form the coming up detailed description and illustration, it will be understood by the person skilled in the art that various changes in form and detail may be made without departing from the spirit and scope of the invention. Although only the preferred embodiment of this invention is to be shown and described in the following, it is requested that any modification and/or combination that come within the spirit of this invention be protected.

DETAILED DESCRIPTION OF THE PREFERRED EMBODIMENT

The present invention provides a blast proof apparatus for the coin return cavity of a public phone, where the main feature of the present invention relates to the configuration of the cover for the coin return cavity, so the high pressure formed is released when a blast occurs within the coin return cavity in order to avoid damages on the coin return apparatus.

Figure 1:
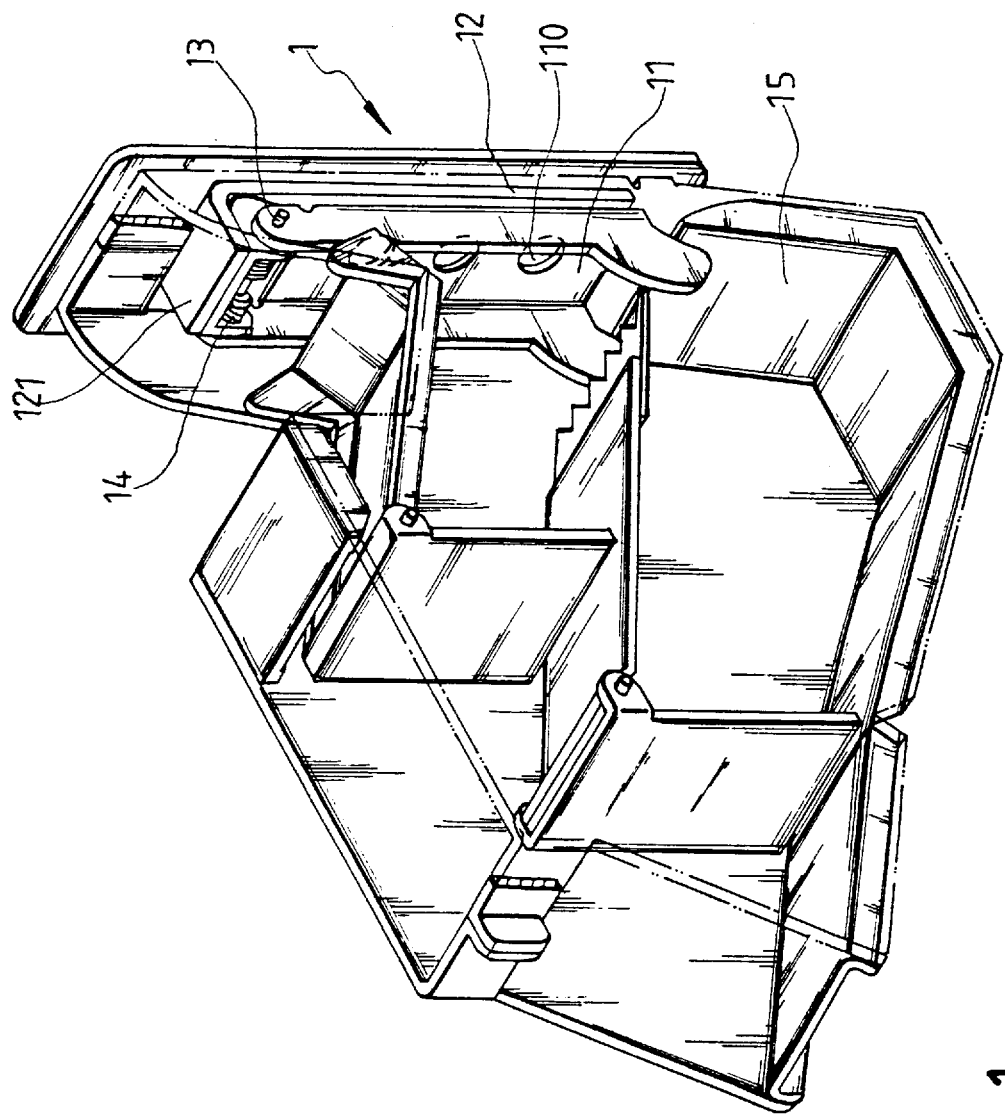
FIG. 1 is a perspective view of a blast proof apparatus for the coin return cavity of a public phone according to the present invention.
Figure 2:
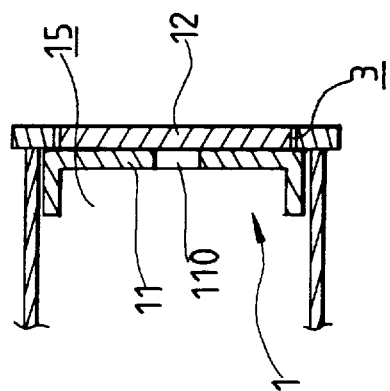
FIG. 2 is a cross-sectional view of the coin return cavity cover with the coin return mouth according to the present invention.
Figure 3:
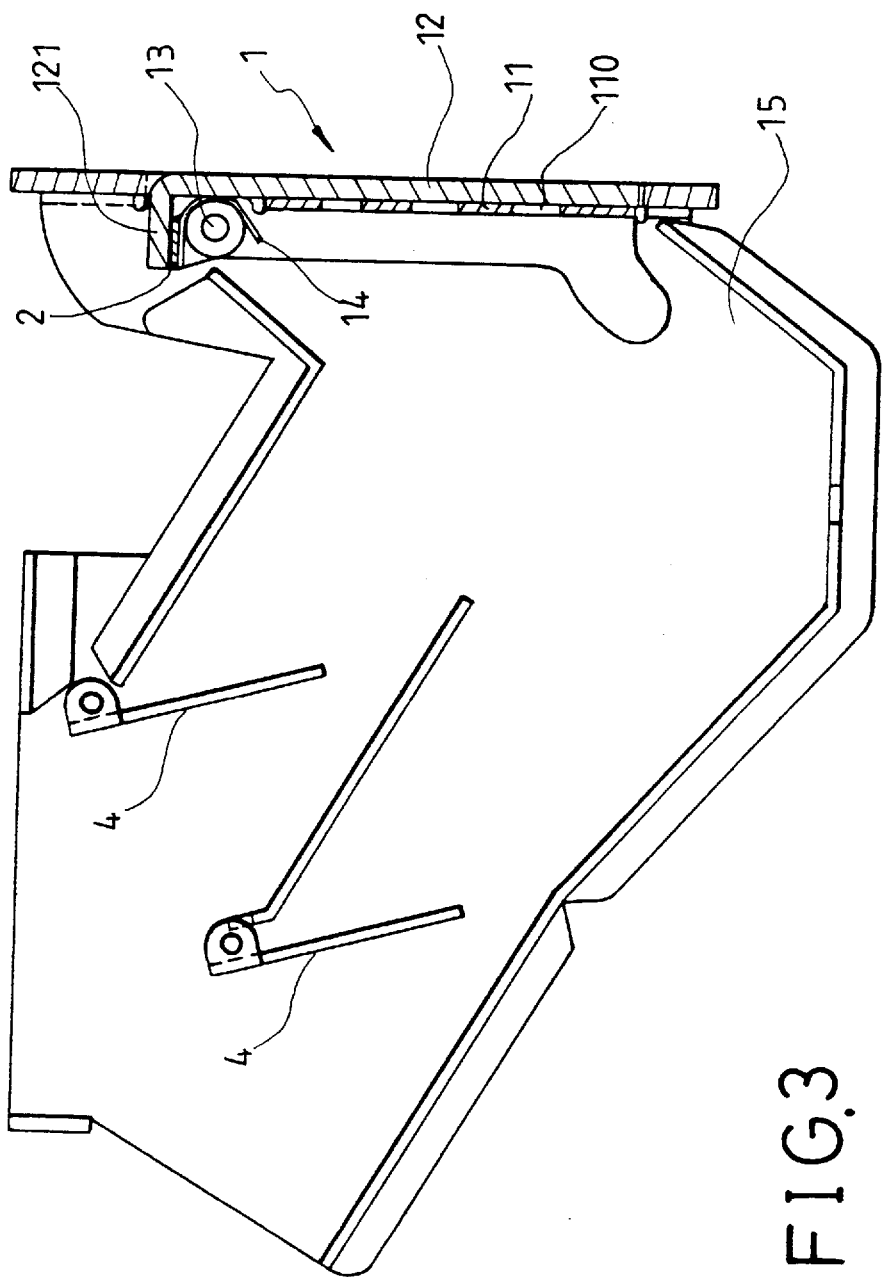
FIG. 3 is a cross-sectional view of the coin return cavity under the normal condition according to the present invention.

As illustrated in FIG. 1 and FIG. 2, the coin return cavity cover of the present invention comprises an inner cover 11 and an outer cover 12 to form a medium covering the coin return mouth 3 accordingly (as shown in FIG. 2) and an anti-return cover board which prevents criminals from damaging the interior mechanical elements by long strip tools. The said inner cover 11 has a width less than the coin return cavity 15 but greater than the coin return mouth 3 to allow inward movement of the inner cover 11 but not the outward movement. A number of through holes 110 are formed on the surface of the inner cover together with pivot holes positioned at the top on the two sides. The outer cover 12 has a width less than the coin return mouth 3 and the inner cover 11. A protruded board 121 is formed on the top edge of the outer cover 12 to form an L shaped body of the outer cover 12. The inner surface of the protruded board 121 is welded with a fixation mean 2 where the two sides of the fixation mean has pivot holes fixed thereto.

The outer cover 12 binds to the outer surface of the inner cover 11. It is done by inserting the pivot 13 into the pivot holes of the inner cover 11 and the fixation mean 2 and then fixed to the top of the interior of the coin return cavity 15. Meanwhile, the pivot 13 passes through the centre of the torsional spring 14 so the spring 14 bonds between the inner cover 11 and the outer cover 12. Two feet extending from the spring 14 forms a force applying point respectively and applies to the inner cover 11 and fixation mean 2 accordingly so the outer cover 12 and the inner cover 11 binds closely together. As the width of the inner cover 11 is greater than the coin return mouth 3, the inner cover 11 is prevented from being pushed outward by the coin return mouth 3 and allows only inward pushing (as shown in FIG. 2). However, the width of the outer cover 12 is smaller than the coin return mouth 3, so the outer cover 12 can be pushed bi-direction both inward and outward.

Figure 4:
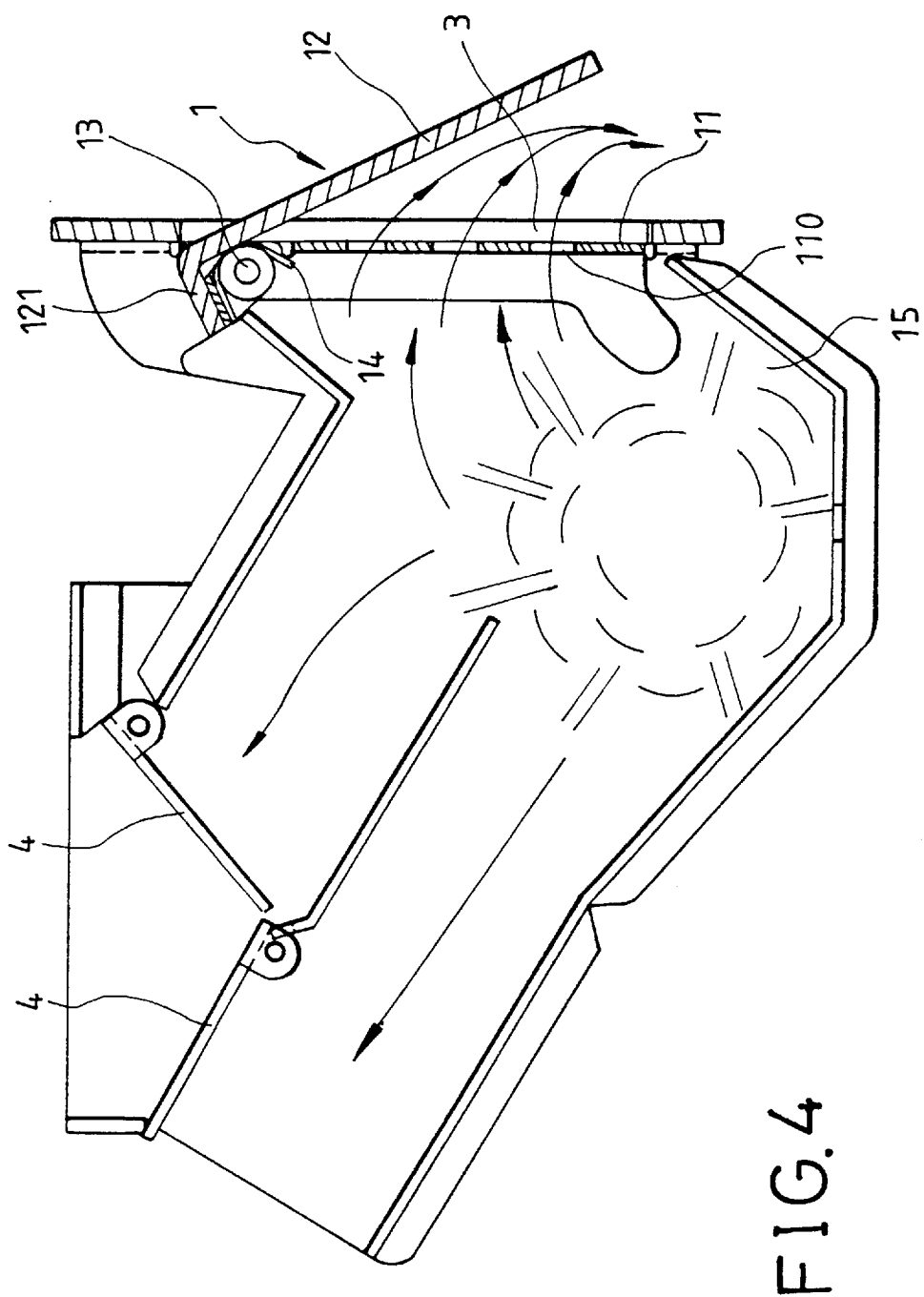
FIG. 4 is a cross sectional view showing the coin return cavity under attack by the explosive to form a blast and the mechanism of pressure releasing according to the present invention.

Through the embodiment of the coin return cavity cover 1 as described above and its weight formed thereto, the coin return cavity 15 is occluded under normal condition; pushing the coin return cavity cover 1, both the outer cover 12 and the inner cover 11 are pushed inward to open the coin return cavity 15 to allow coins left therein to be removed. When the explosive is placed in the coin return cavity 15 and exploded, the high pressure formed will automatically shut down the anti-return cover board 4 to prevent the said pressure from travelling upward and damaging the inner mechanical and circuit board of the phone. Meanwhile, the pressure is lead by the through hole 110 of the inner cover 11 to push the outer cover 12 outward and is therefore released (as shown in FIG. 4). Once the high pressure formed by the explosion is reduced to less than the elastic force of the torsional spring 14, the elastic force of the spring 14 is again applied to the fixation mean 2 of the outer cover and binds with the inner cover 11 to cover up the through holes 110 (i.e. back to normal condition), and succeed its function on blast proofing.

What is claimed is:

1. A blast proof apparatus for a coin return cavity of a public phone comprising:

A pivot, formed and positioned inside the top of the coin return cavity;

An inner cover, having a width greater than the coin return mouth together with a plurality of through holes formed on a surface thereof;

An outer cover, having a width less than both the inner cover and the coin return mouth which bonds to the outer surface of the inner cover to form a coin return mouth cover, and then by said pivot to occlude the coin return mouth; and A spring element, positioned at the fixation point of said pivot, the elasticity force of the spring is to be applied to the outer cover, so the inner and outer covers are closely binds together to form a coin return mouth cover; under the normal situation, said cover allows only single direction—push inward to open the coin return mouth, once an explosion occurs within the coin return cavity, the high pressure formed will be released by pushing the outer cover outward through the through holes of the inner cover in order to avoid possible damage in the coin return apparatus.

2. The blast proof apparatus as claimed in claim 1, where the top end of said outer cover forms a protrude edged board, a fixation mean is then welded to the inner surface of said protrude board having pivot holes set respectively at the two sides, said inner cover also having pivot holes formed respectively on the two sides so the pivot is inserted through the inner cover and the fixation mean to form a unity item.

3. The blast proof apparatus as claimed in claim 1, wherein said spring element is a torsional spring and fitted to the pivot when said pivot is inserted to the inner cover and the fixation mean, so the two force applying points of the twisted spring are applied and pushed toward the inner cover and the fixation element of the outer cover accordingly to bind the inner and outer covers closely attached.

* * * * *